United States Patent

[11] 3,577,899

| [72] | Inventor | Yoshizo Ikegami |
| | | Nishinomiya-shi, Japan |
| [21] | Appl. No. | 693,384 |
| [22] | Filed | Dec. 26, 1967 |
| [45] | Patented | May 11, 1971 |
| [73] | Assignee | Fuji Shashin Film Kabushiki Kaisha |
| | | Kanagawa, Japan |
| [32] | Priority | Dec. 24, 1966 |
| [33] | | Japan |
| [31] | | 41/84692 |

[54] FLASH SYSTEM FOR A PHOTOGRAPHIC CAMERA
2 Claims, 3 Drawing Figs.

| [52] | U.S. Cl. | 95/11 |
| [51] | Int. Cl. | G03b 17/02 |
| [50] | Field of Search | 95/11 |
| | (Misc), 11 (Lamp), 11.5; 240/1.3; 317/230, 256, (Inquired) | |

[56] References Cited
UNITED STATES PATENTS

| 877,656 | 1/1908 | Luschka | 317/256X |
| 2,604,517 | 7/1952 | Brennan | 317/230 |
| 2,771,825 | 11/1956 | Naumann | 95/31 |
| 2,783,696 | 3/1957 | Sewig | 95/11 |
| 2,938,441 | 5/1960 | Klingenstein | 95/11 |
| 3,437,021 | 4/1969 | Kapteyn et al. | 95/11 |

FOREIGN PATENTS

| 1,048,486 | 11/1966 | Great Britain | 95/11 |

*Primary Examiner*—John M. Horan
*Assistant Examiner*—Fred L. Braun
*Attorney*—Sughrue, Rothwell, Mion, Zinn & MacPeak ABSTRACT: A high-speed photographic flash system for a camera assembly. The camera assembly includes an outer case which is detachably connected to the main body of the camera and carries a portion of the electrical components for the photographic flash system. The flash system includes an electric cell, a trigger coil, a discharge tube and a thin plate-shaped electrolytic condenser. The plate-shaped condenser is carried by and extends along a portion of the outer case wall and is electrically connected to the main body of the camera when the outer case is connected thereto.

Patented May 11, 1971
3,577,899
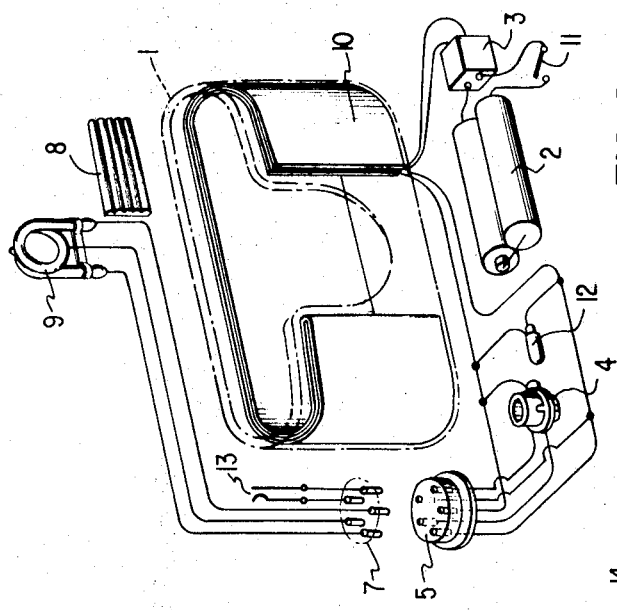
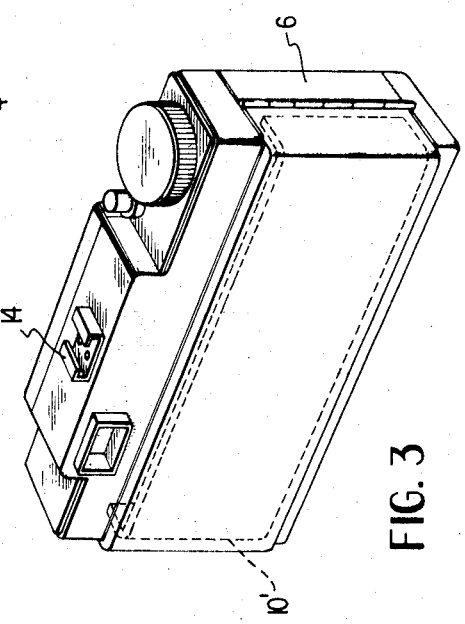
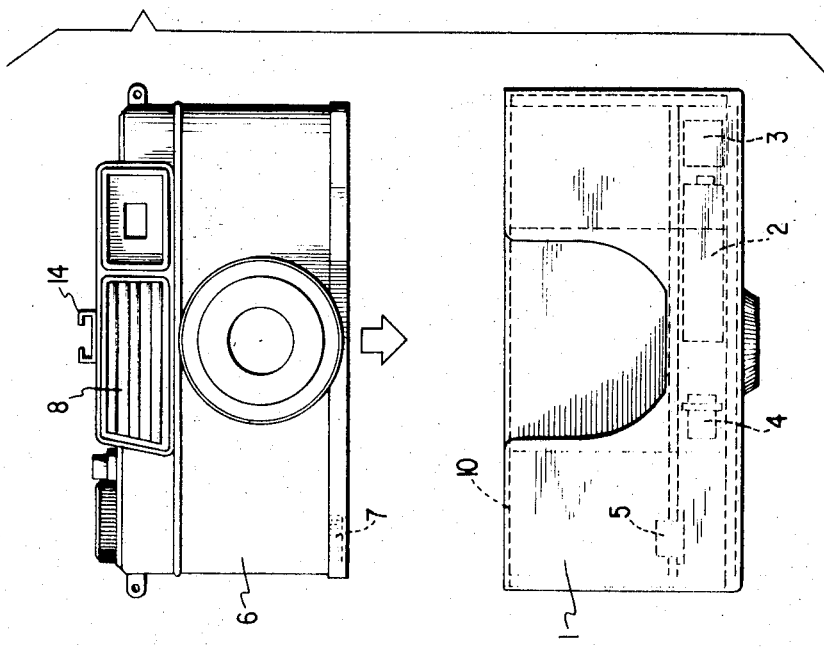
INVENTOR
YOSHIZO IKEGAMI

FLASH SYSTEM FOR A PHOTOGRAPHIC CAMERA

The present invention relates to a high-speed photographic lighting system having a plate-shaped electrolytic condenser within the camera or camera case thereby making the size of the high-speed lighting system smaller, while at the same time making it possible to manufacture the camera and the high speed lighting system in unitary form.

It is conventional to use a flashgun as a light-generating device and it is further conventional to build the same into a camera. Flashguns carried by cameras use a relatively small paper condenser and a lighting system of this type may be readily built into the camera by using a thumbtack flash tube and a high-quality, small cell or battery, but for a high-speed photographic lighting system which requires, in conventional terms, a large cylindrical electrolytic condenser having large capacity, it has been impossible to incorporate the system as a unit within the camera body without ignoring both an increase in weight or appearance to the resulting camera.

The principal object of the present invention is to provide a high-speed lighting system or device which is built into the camera by making the electrolytic condenser of such configuration and dimension that it may be readily mounted in a back cover of a camera or within the camera case.

Other objects in accordance with the present invention will be apparent from the following description and the accompanying drawings, in which:

FIG. 1 is an exploded, front view of a camera and camera case forming a camera assembly which incorporate, in unitary form, a high-speed lighting system as one embodiment, in accordance with the present invention.

FIG. 2 is a perspective view of the high-speed photographic lighting system of the present invention as applied to the embodiment of FIG. 1.

FIG. 3 is a perspective view of a photographic high-speed lighting system in which the electrolytic condenser, in plate form, is carried within the camera body in the form of an alternate embodiment of the present invention.

Referring to the drawings, one embodiment of the high-speed lighting system in accordance with the present invention is shown in FIGS. 1 and 2. A relatively small battery or cell 2 is carried by camera case 1, as is a boosting rectifier 3, a trigger coil 4 and a plug 5, these components being contained in a double bottom of the camera case 1. Further, the camera case 1 carries a plug 5 in the form of a female coupling device which cooperates with male plug 7 corresponding to plug 5 which is disposed on the bottom of the camera 6. In the upper portion of the camera, there is disposed a glass plate 8 with an electric discharge tube 9 acting as a light source which is positioned behind the glass plate. In the wall of the camera case 1, there is disposed an electrolytic condenser 10 which is plate-shaped in configuration. The electric elements of the high-speed photographic lighting system are connected electrically with each other in a conventional manner and as indicated in FIG. 2, the system employs a main switch 11, a neon tube 12 and an X-contact 13 which is carried by the camera and is closed when the camera shutter is fully open. When camera 6 is placed in the camera case 1, as indicated by the arrow in FIG. 1, the plug sections 5 and 7 are connected to complete the electrical circuitry. After turning on the main switch 11, the neon tube 12 is lighted when the electrolytic condenser 10 is fully charged. When the neon tube 12 is lighted, the electric discharge tube 9 may be energized by pushing down on the shutter button, thus closing the normally open X-contacts 13 at the time the shutter is fully open. Preferably, the neon tube is built into the optical finder system so that its condition may be readily observed. In the present invention, the discharge tube 9 although shown as being built into the camera, may not necessarily be so positioned but may be carried by a separate case (not shown) which could be fixed to the camera through accessory shoe 14.

Referring to FIG. 3, as an alternate embodiment, the electrolytic condenser 10' is shown as being bent into U-shape, and is placed along the inside of the back cover of camera 6. In this embodiment, the battery or cell and the trigger coil may be readily carried by the camera body. Further in this case, the discharge tube, such as tube 9, is not necessarily carried by the camera body but may be carried by a separate case and set on accessory shoe 14.

According to the present invention, the high-speed lighting system is extremely small and compact so that the system components may be placed in the camera case or in the camera body itself, and in this fashion, the high-speed lighting system is made as a unit with the camera, achieved principally by making the electrolytic condenser thin in form and built into the camera case or the back cover of the camera.

I claim:

1. A camera assembly comprising a camera, a detachable outer case having walls disposed around the sides and bottom of said camera, and a high-speed photographic lighting system which includes an electric cell, a trigger coil, a discharge tube and a thin plate-shaped electrolytic condenser, said condenser being carried within and extending along the portion of said outer case wall which conforms to the sides of said camera.

2. A camera comprising a body portion, a back cover pivotally coupled to said body portion to allow film loading and removal and a high-speed photographic lighting system which includes an electric cell, a trigger coil, a discharge tube and a thin plate-shaped electrolytic condenser, wherein said condenser is carried by and is substantially coextensive with the inner surface of said pivotable back cover.